United States Patent
Lohre et al.

(10) Patent No.: US 11,097,518 B2
(45) Date of Patent: *Aug. 24, 2021

(54) COATED POLYESTER FILM WITH A PERMANENT ANTIFOG COATING AND TRANSPARENCY OF AT LEAST 93 %

(71) Applicant: Mitsubishi Polyester Film GmbH, Wiesbaden (DE)

(72) Inventors: Claudia Lohre, Wiesbaden (DE); Holger Kliesch, Ginsheim-Gustavsburg (DE); Andreas Bork, Westhofen (DE); Yavuz Ünker, Nieder-Olm (DE); Viktor Fischer, Mainz (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,652

(22) Filed: Sep. 12, 2018

(65) Prior Publication Data
US 2019/0077137 A1 Mar. 14, 2019

(30) Foreign Application Priority Data
Sep. 14, 2017 (DE) .......................... 102017216258.9

(51) Int. Cl.
| | |
|---|---|
| B32B 27/16 | (2006.01) |
| A01G 9/22 | (2006.01) |
| A01G 9/14 | (2006.01) |
| C08J 7/04 | (2020.01) |
| C08J 7/043 | (2020.01) |
| C08J 7/054 | (2020.01) |
| C08J 7/056 | (2020.01) |
| B29C 48/00 | (2019.01) |
| B29C 48/08 | (2019.01) |
| B29C 48/21 | (2019.01) |
| B32B 27/08 | (2006.01) |
| B32B 27/36 | (2006.01) |
| C08J 7/06 | (2006.01) |
| C09D 5/00 | (2006.01) |
| C09K 3/18 | (2006.01) |
| B29K 67/00 | (2006.01) |
| B29L 7/00 | (2006.01) |

(52) U.S. Cl.
CPC ............ *B32B 27/16* (2013.01); *A01G 9/1438* (2013.01); *A01G 9/22* (2013.01); *B29C 48/0018* (2019.02); *B29C 48/022* (2019.02); *B29C 48/08* (2019.02); *B29C 48/21* (2019.02); *B32B 27/08* (2013.01); *B32B 27/36* (2013.01); *C08J 7/042* (2013.01); *C08J 7/043* (2020.01); *C08J 7/0427* (2020.01); *C08J 7/054* (2020.01); *C08J 7/056* (2020.01); *C08J 7/065* (2013.01); *C09D 5/006* (2013.01); *C09K 3/18* (2013.01); *B29K 2067/00* (2013.01); *B29L 2007/008* (2013.01); *B32B 2255/10* (2013.01); *B32B 2255/24* (2013.01); *B32B 2307/412* (2013.01); *C08J 2367/02* (2013.01); *C08J 2433/04* (2013.01); *C08J 2433/08* (2013.01)

(58) Field of Classification Search
CPC ............ B32B 7/00–7/14; B32B 27/36; G02B 1/11–1/18; G02B 5/282; G02B 5/287
See application file for complete search history.

(56) References Cited

U.S. PATENT DOCUMENTS

| | | | | |
|---|---|---|---|---|
| 5,580,819 A | * | 12/1996 | Li | B32B 17/10018 427/162 |
| 5,585,186 A | * | 12/1996 | Scholz | C03C 17/007 106/287.1 |
| 6,455,142 B1 | * | 9/2002 | Heberger | C08J 7/0427 428/215 |
| 2002/0150751 A1 | * | 10/2002 | Murschall | G09F 7/00 428/331 |
| 2008/0146703 A1 | * | 6/2008 | Kliesch | B32B 27/08 524/100 |
| 2010/0297451 A1 | | 11/2010 | Zhao et al. | |
| 2013/0224478 A1 | * | 8/2013 | Jing | C09D 1/00 428/331 |
| 2014/0335360 A1 | * | 11/2014 | Jing | C03C 17/009 428/412 |

FOREIGN PATENT DOCUMENTS

| | | |
|---|---|---|
| DE | 69731750 | 2/2006 |
| DE | 102016200875 A1 | 7/2017 |
| EP | 0144948 A2 | 6/1985 |
| EP | 0769540 A2 | 4/1997 |
| EP | 1152027 A1 | 11/2001 |
| EP | 1534776 A1 | 6/2005 |
| EP | 1647568 B1 | 1/2009 |

(Continued)

OTHER PUBLICATIONS

Morefield et al. "Colloidal Silicon Dioxide", (2002); pp. 161-164.*
"ASTM D1003-13 Standard Test Method for Haze and Luminous Transmittance of Transparent Plastics," ASTM Book of Standards Volume: 08.01, pp. 222-228, Jan. 1, 2013, URL: https://www.astm.org/Standards/D1003.htm.
Buskens, Pascal, et al., "Antireflective Coatings for Glass and Transparent Polymers," Langmuir, May 2016, 32, pp. 6781-6793.
European Search Report, European Patent Application No. 18192912.6.

(Continued)

*Primary Examiner* — Prashant J Khatri
(74) *Attorney, Agent, or Firm* — ProPat, LLC

(57) ABSTRACT

The present invention relates to a coated polyester film equipped on at least one side with permanent antifog coating. The film of the invention is suitable for the production of greenhouse blinds, and has specific transparency properties, permanent antifog properties and high UV resistance. The invention further relates to processes for the production of the polyester film of the invention, and also to use thereof.

26 Claims, No Drawings

(56) References Cited

FOREIGN PATENT DOCUMENTS

| EP | 2216362 A1 | 8/2010 | |
|----|------------|--------|---|
| EP | 1777251 B1 | 3/2013 | |
| WO | 9722655 A1 | 6/1997 | |
| WO | WO-2016126362 A1 * | 8/2016 | ........... C09D 5/1675 |

OTHER PUBLICATIONS

J. A. Woollam et al., "Overview of variable-angle spectroscopic ellipsometry (VASE): I. Basic theory and typical applications," Optical Metrology, SPIE vol. CR72, pp. 3-28, 1999.

* cited by examiner

COATED POLYESTER FILM WITH A PERMANENT ANTIFOG COATING AND TRANSPARENCY OF AT LEAST 93 %

CROSS-REFERENCE TO RELATED APPLICATIONS

This application claims priority to German Patent Application 10 2017 216 258.9 filed Sep. 14, 2017, which is hereby incorporated herein by reference in its entirety.

FIELD OF THE INVENTION

The invention relates to a coated polyester film equipped on at least one side with permanent antifog coating. The film of the invention is suitable for the production of greenhouse blinds, and has specific transparency properties, permanent antifog properties and high UV resistance. The invention further relates to processes for the production of the polyester film of the invention, and also to use thereof.

BACKGROUND

Films for blinds in greenhouses must comply with a series of requirements. Firstly, that portion of the light that is required for plant growth should pass through the film/blind, and that portion of the light that is not required and that would lead to excessive heating of the greenhouse should be reflected. During the night and in the early morning hours, the blind should moreover retain the heat that rises from the soil, not only by retarding convection but also by reflection and radiation within the greenhouse, thus providing ideal incident-light conditions. Permeability to light must be high in the photosynthetic wavelength range, because this is the range required by plants for ideal plant growth. As far as possible, there should be no impairment of permeability to light in weather conditions under which water condenses on the blinds.

The term antifog is used to describe water droplets on the surface of transparent plastics films. By virtue of the typically high humidity in a greenhouse, under appropriate weather conditions (e.g. temperature differences between day and night) condensed water arises in the form of water droplets in particular on the surface of that side of greenhouse blinds that faces toward the plants. Another factor favoring condensation of water, alongside weather conditions, is different surface tension of water and plastic. Films with antifog properties prevent water-droplet 1.5 formation and permit viewing through the plastics film with no fogging. It is generally possible, during the extrusion process, to incorporate antifog additives into the polymer matrix or to apply these as coating to the polymer matrix. These antifog additives are generally bivalent compounds that have a nonpolar aliphatic region for anchoring in the polymer matrix and a polar hydrophilic region that can interact with water and thus reduce the surface tension of the water droplets in a manner such that (by virtue of a hydrophilic surface) a continuous transparent water film develops on the film surface. In order to avoid reduction of yield, the use of antifog additives should have no adverse effect on permeability to light and thus on the transparency of the greenhouse films. In contrast to a liquid film, water droplets cause a high degree of light-scattering and increased reflection, and in particular in the morning hours when illumination levels are low these factors lead to a significantly lower level of photosynthesis. Rotting of plants or plant parts caused by non-adhering or falling water droplets is moreover avoided, and burning of plants or plant parts caused by droplets functioning like a lens on the film surface in incident light is reduced. It would moreover be desirable that the greenhouse film has UV resistance that permits use of the blind in a greenhouse for at least five years while not exhibiting any significant yellowing, embrittlement or cracking on the surface or serious impairment of mechanical properties or significant loss of transparency. The antifog component is not permitted to comprise any substances that are toxic and/or particularly harmful to the environment, in case droplet formation nevertheless occurs under conditions of very severe water condensation. Among the undesirable substances, mention should in particular be made of alkylphenol ethoxylates, which are often used in antifog systems (e.g. WO 1995018210).

Surface-active coatings based on hydrophilic water-soluble polymers and/or surfactants are generally used for coating the surfaces of plastics films in order to achieve an antifog effect. These surfactants can be of nonionic, cationic, anionic or zwitterionic type. It is moreover possible to use polymeric surfactants or protective colloids as antifog agents. Examples of other familiar components for an antifog coating are fatty acid esters and derivatives of these, aliphatic alcohols and esters of these, polyethoxylated aromatic alcohols, mono- or polyesterified sorbitol esters, mono- or polyesterified glycerol esters, mixed glycerol esters, or by way of example ethoxylated amines. Typical examples are active ingredient combinations made of the three substance classes, for example glycerol esters, sorbitol esters and ethoxylated amines. Suitable substances used as antifog additives are described by way of example in WO 97/22655 A1. A fundamental problem with water-soluble polymers and/or surfactants is that the coating can easily be removed by washing, with resultant impossibility of realizing a permanent antifog effect. Familiar polyester films with antifog coating are described in EP 1647568 B1 and EP 1777251 B1. Those polyester films have good mechanical properties, but exhibit relatively low transparency. They moreover exhibit relatively low long-term resistance to weathering. Furthermore, the antifog effect of those polyester films has only a short lifetime of a few months, because the antifog additives used can easily be removed by washing and are water-soluble, and therefore during use as greenhouse blind the active substance rapidly becomes unavailable. EP 1152027 A1, EP 1534776 A1 and EP 2216362 A1 describe polyolefin films based on PVC, LDPE and EVA with long-lasting antifog properties for food packaging and greenhouse applications with use of antifog additives based on inorganic hydrophilic colloidal substances (colloidal silicon, aluminum and others) and nonionic, anionic or cationic surface-active additives. Although these exhibit permanent antifog properties, they differ from polyester-based greenhouse blinds in having a greatly reduced level of mechanical properties. Use of polyolefin-based films can be categorically excluded for the intended application, because, unlike in the case of PET, the relatively rapid UV-degradation of the PE makes it impossible to achieve the desired long-term stability and therefore the long lifetime of five years, with resultant reduced cost-effectiveness. A consequence of the lower mechanical stability of polyolefins is moreover that the blinds become overstretched and lose their very substantially coherent structure, with resultant reduced insulation effect.

SUMMARY OF ADVANTAGEOUS EMBODIMENTS OF THE INVENTION

The polyester films of the prior art are disadvantageous because they do not have a permanent antifog coating in combination with high transparency and long-term stability.

It was an object of the present invention to produce a polyester film which has permanent antifog properties together with high transparency of at least 93% and UV resistance for at least five years, without any significant resultant yellowing or any embrittlement or cracking of the surface or any impairment of the mechanical and optical properties that are critical for the application. The thickness of the film should be from 10 to 40 µm, and moreover the film should be amenable to cost-effective production in existing polyester film systems, single-layer systems or multilayer systems.

Said object is achieved via a coated polyester film with transparency of at least 93% comprising:
at least one base layer B which comprises a thermoplastic polyester and a UV stabilizer;
where the polyester film has a first and a second surface, where a permanent antifog coating has been applied on at least one of the surfaces of the polyester film, and where the refractive index of the antifog coating is lower than that of the base layer B.

DETAILED DESCRIPTION

The polyester film of the present invention is a biaxially oriented polyester film. Total film thickness is at least 10 µm and at most 40 µm. Film thickness is preferably at least 14 µm and at most 23 µm, and particularly preferably at least 14.5 µm and at most 20 µm. If film thickness is less than 10 µm, the mechanical strength of the film is no longer sufficient to avoid overstretching during absorption of the tensile forces arising in the energy-saving blind. Above 40 µm, the film becomes too stiff, and when the blind is not in use and is raised the resultant "film roll" is excessively large and correspondingly casts an excessively large shadow.

For the purposes of the present invention, a layer is a polymer layer formed by means of coextrusion. The polyester film of the present invention is therefore formed by one or more layer(s).

For the purposes of the present invention, a coating is the product of drying of an aqueous dispersion applied to the polyester film, and is not involved in the extrusion process of the polyester film per se.

The polyester film comprises a base layer B. Single-layer films consist only of this base layer. In a multilayer embodiment, the polyester film consists of the (i.e. of one) base layer and of at least one further layer A. The polyester film can comprise a further layer C. If the film comprises two further layers A and C, the base layer B then forms an intermediate layer. The polyester film has a first and a second surface. In the case of a single-layer film, the surfaces of the base layer B form the surfaces of the polyester film. If the polyester film comprises a base layer B and a further layer A or C, that surface of the base layer that faces away from the further layer A or C forms a first surface of the polyester film, and that surface of the further layer A or C that faces away from the base layer forms the second surface of the polyester film. If the polyester film has a base layer B and two further layers A and C, that surface of the layer A that faces away from the base layer is a first surface of the polyester film, and that surface of the layer C that faces away from the base layer forms the second surface of the polyester film. In the multilayer embodiment, the thickness of the base layer is at least as great as the sum of the other layer thicknesses. The thickness of the base layer is preferably at least 55% of the total film thickness and particularly preferably at least 63% of the total film thickness. The thickness of the other layers is at least 0.5 µm, preferably at least 0.6 µm and particularly preferably at least 0.7 µm. The thickness of the further layers A and/or C is at most 3 µm and preferably at most 2.5 µm and particularly preferably at most 1.5 µm. Below 0.5 µm, the further layer has reduced stability during processing and reduced uniformity in thickness. Starting at 0.7 µm, very good stability during processing is achieved. If the layers A and/or C are excessively thick, cost-effectiveness decreases because, in order to ensure adequate properties (in particular UV resistance), regrind should be introduced only into the base film, and if base layer thickness is too low in comparison with total thickness the percentage of regrind that must then be introduced into that layer in order that all of the regrind is used is then excessive. By way of the base layer this can then also have an adverse effect on properties such as UV resistance and transparency. Furthermore, the further layers A and/or C (in multilayer embodiments) generally comprise particles in order to improve slip properties (improvement of windability). These particles cause loss of transparency due to back-scattering. If the proportion of the further layers A and/or C with said particles becomes too large, achievement of the transparency properties of the invention becomes significantly more difficult.

High layer thicknesses of the optionally present film layer C, where this provides an antireflective modification, lead to an undesirable cost increase because of the relatively high UV stabilizer content which is required in copolymer-modified layers and is present in that layer.

The base layer B and the layers A and/or C (insofar as the layer C does not provide an antireflective modification) consist at least to an extent of 70% by weight of a thermoplastic polyester; the remaining constituents are formed by additives such as UV stabilizers, particles, flame retardants, polyolefins, COCs and other additives and/or polyester-compatible polymers, for example polyamides. Quantities present of the other additives and/or polyester-compatible polymers (e.g. polyamides) in the invention are less than 20% by weight, preferably less than 2% by weight and particularly preferably 0 in the base layer B and the layers A and/or C. When the regrind is returned during the film-production process, use of other additives and/or polymers can lead to undesirable yellowing of the film, as a result of which the regrind content has to be reduced and the cost-effectiveness of the process is thus reduced. Use of other additives can moreover lead to impairment of mechanical properties of the film.

Polyesters that have proven to be suitable are inter alia polyesters made of ethylene glycol and terephthalic acid (=polyethylene terephthalate, PET), made of ethylene glycol and naphthalene-2,6-dicarboxylic acid (=polyethylene 2,6-naphthalate, PEN), and furan-2,5-dicarboxylic acid and ethylene glycol, and also made of any desired mixtures of the abovementioned carboxylic acids and diols. Preference is given to polyesters consisting of at least 85 mol % of units derived from ethylene glycol and terephthalic acid, preferably at least 90 mol % and particularly preferably at least 92 mol %. Use of naphthalene-2,6-dicarboxylic acid has no advantages over use of terephthalic acid, and naphthalene-2,6-dicarboxylic acid is therefore usually omitted because it is relatively expensive. Furan-2,5-dicarboxylic acid is generally not used, because it is relatively expensive. The remaining monomer units derive from other aliphatic, cycloaliphatic or aromatic diols and, respectively, dicarboxylic acids.

Examples of suitable other aliphatic diols are diethylene glycol, triethylene glycol, aliphatic glycols of the general formula HO—$(CH_2)_n$—OH, where n is preferably less than 10, cyclohexanedimethanol, butanediol, propanediol, etc. Examples of suitable other dicarboxylic acids are isophthalic acid, adipic acid, etc. It has proven to be advantageous for smooth running and weathering resistance in greenhouse applications that the film comprises less than 2% by weight, preferably less than 1.5% by weight, of diethylene glycol. (based on the total weight of the polyester of the layer) or, respectively, units derived from diethylene glycol. For the same reasons, it had proved to be advantageous that the base layer B and the layers A and/or C comprise less than 12 mol %, preferably less than 8 mol %, and ideally less than 5 mol %, of isophthalic acid (IPA) in relation to the dicarboxylic acid component of the polyester. It has moreover proven to be advantageous that the base layer B and the layers A and/or C comprise less than 3 mol %, preferably less than 1 mol % of CHDM (1,4-cyclohexanedimethanol) in relation to the diol component of the polyester. If the content of the abovementioned comonomers, in particular that of CHDM, does not exceed the abovementioned limits, the UV resistance of the energy-saving blinds produced from the film is significantly better than in the case of embodiments where the limits are exceeded.

If the layer C is applied via coextrusion to the base layer B, where this forms an antireflective modification of the present invention and is opposite to the antifog coating, this layer C then comprises comonomers in the quantities stated at a later stage below. In the case of a single-layer embodiment (monofilm), the film is provided by the base layer B.

For the production of the film of the invention, the SV value of the polyester used is selected in a manner such that the SV value of the film is greater than 600, preferably greater than 650 and particularly preferably greater than 700. The SV value of the film here is less than 950 and preferably less than 850. If the SV value is below 600, the brittleness of the film during the production process is sufficiently high to cause frequent break-offs. Further loss of viscosity occurs more rapidly in the final applications, with loss of flexibility of the films, resulting in fracture. Furthermore, achievement of the abovementioned mechanical strength properties becomes unreliable if the SV value is lower. If the SV of the film is intended to be higher than 950, the average SV of the polymers used would then likewise have to be at least 950. Their viscosity would then remain high in the melt in the extruder, to the extent that excessively high electrical currents would arise during the operation of the electric motors in the extruder, and pressure variations would occur during the extrusion process, preventing smooth running.

The polyester film can be transparent, opaque, glossy or matte. These different optical properties are achieved by way of example via addition of different quantities of additives such as barium sulfate, calcium carbonate, amorphous silica or titanium dioxide. These additives can be present not only in the base layer B but also in the layer C. Addition of matting or opacifying additives is permissible only in quantities that cannot endanger the inventive transparency.

The film must moreover have low transmittance in the wavelength range from below 370 nm to 300 nm. At every wavelength in the stated range this is less than 40%, preferably less than 30% and particularly preferably less than 15%. The film is thus protected from embrittlement and yellowing; the plants and equipment in the greenhouse are moreover thus protected from UV light. Transparency between 390 and 400 nm is greater than 20%, preferably greater than 30% and particularly preferably greater than 40%, because this wavelength range already has significant activity for photosynthesis, and excessive filtering in that wavelength range would adversely affect plant growth. The low permeability to UV is achieved via addition of organic UV stabilizer. Low permeability to UV light protects the optionally present flame retardant from rapid decomposition and severe yellowing. The organic UV stabilizer here is selected from the group of the triazines, benzotriazoles and benzoxazinones. Particular preference is given here to triazines, inter alia because at the processing temperatures of from 275 to 310° C. usually used for PET they have good thermal stability and cause little evolution of gas from the film. In particular, 2-(4,6-diphenyl-1,3,5-triazin-2-yl)-5-(hexyl)oxyphenol (TINUVIN® 1577) is suitable. Particular preference is given here to 2-(2'-hydroxyphenyl)-4,6-bis(4-phenylphenyl) triazines, of the type marketed by way of example by BASF as TINUVI® 1600™. If these are used, the preferred low transparencies below 370 nm can be achieved even with relatively low stabilizer concentrations, together with relatively high transparency at wavelengths above 390 nm.

The film, or in the case of a multilayer film all of the film layers, comprise(s) at least one organic UV stabilizer. Quantities of UV stabilizers added to the layer(s) or to the monofilm in a preferred embodiment are from 0.3 to 3% by weight, based on the weight of the respective layer. Particular preference is given to a UV stabilizer content from 0.75 to 2.8% by weight. Ideally, the layers A and/or C comprise from 1.2 to 2.5% by weight of UV stabilizer. The content of UV stabilizer in % by weight in the base layer is preferably lower than in the layer(s) A and/or C. These stated contents in the layer(s) A and/or C relate to triazine derivatives. If a UV stabilizer from the group of the benzotriazoles or benzoxazinones is used instead of all or some of a triazine derivative, the triazine component content replaced must be replaced by 1.5 times the quantity of a benzotriazole component or benzoxazinone component.

For the purposes of the invention, the quantity present of whitening polymers that are incompatible with the main polyester constituent, for example polypropylene, cycloolefin copolymers (COCs), polyethylene, uncrosslinked polystyrene, etc., is less than 0.1% by weight (based on the weight of the film) and ideally 0% by weight, because these greatly reduce transparency and have an adverse effect on fire performance, and are susceptible to severe yellowing on exposure to UV and would therefore require considerable additional quantities of UV stabilizer, thus significantly reducing cost-effectiveness.

Base layer B and the further layer(s) A and/or C can comprise particles to improve windability. Examples of these inorganic or organic particles are calcium carbonate, apatite, silicon dioxides, aluminum oxide, crosslinked polystyrene, crosslinked polymethyl methacrylate (PMMA), zeolites and other silicates such as aluminum silicates, and also white pigments such as $TiO_2$ or $BaSO_4$. These particles are preferably added to the layers A and/or C to improve the windability of the film. If such particles are added, preference is given to use of silicon-dioxide-based particles, because these have little transparency-reducing effect. The proportion of these or other particles in any layer is not more than 3% by weight and is preferably less than 1% by weight and particularly preferably less than 0.2% by weight in every layer, based in each case on the total weight of the relevant layer. In the case of a multilayer embodiment, these particles are preferably added only to one or both layers A and/or B, passing only in very small proportions by way of the regrinding to the base layer. The particles required for winding thus cause very little reduction of transparency. It is preferable when an external layer comprises at least 0.07% by weight of these particles.

Because fires in greenhouses are very costly, the film must have reduced flammability.

Achievement of fire performance suitable for energy-saving greenhouse blinds requires no flame retardants if the contents of particles, and also of white pigments and incompatible polymers, are within the preferred ranges, or preferably within the particularly preferred ranges (the fire test grade then achieved by the film being 4 or better). If contents higher than the preferred contents are used in the case of one of the groups mentioned, or if a particular greenhouse application requires a further improvement in fire performance, it has then proven to be advantageous that the film moreover comprises a flame retardant based on organophosphorus compounds. These are preferably esters of phosphoric acid or phosphonic acid. Flame retardants suitable for use in the polyester films of the invention are described by way of example in EP1368405 B1.

The transparency of the film of the invention is at least 93%, preferably 94%, particularly preferably 94.5% and very particularly preferably at least 95%. As transparency increases, assistance provided to plant growth in the greenhouse is improved.

The inventive transparency is achieved when the inventive raw materials and contents of additives and/or particles are used. The main factors influencing the increase of transparency are the permanent antifog coating located on at least one side and, optionally located on the side opposite to the antifog coating, the antireflective coating or antireflection modification of the layer C.

Coatings and Outer-Layer Modifications

In order that the inventive transparency of at least 93%, preferably 94%, particularly preferably 94.5% and ideally 95% is achieved, transparency of the uncoated biaxially oriented polyester film must be at least 91%, and said film must have been equipped with an antifog coating on at least one side.

In one embodiment, the polyester film has been equipped on one side with an antifog coating that simultaneously contributes to the increase of transparency (acts as antireflective modification). This embodiment achieves the desired transparency values. It is necessary here that the refractive index of the antifog coating described below is lower than that of the polyester film. The refractive index here at wavelength 589 nm in machine direction of the film is below 1.64, preferably below 1.60 and ideally below 1.58. The thickness of the antifog coating must moreover be at least 60 nm, preferably at least 70 nm, particularly preferably at least 80 nm and at most 150 nm, preferably at most 130 nm, particularly preferably at most 120 rm. An ideal transparency increase in the desired wavelength range is thus achieved. Below a layer thickness of 60 nm, the antifog coating no longer contributes to transparency increase. However, at a layer thickness of at least 30 nm the permanent antifog properties are retained. If the inventive layer thickness of at most 150 nm is exceeded, the increased quantity applied does not lead to any further transparency increase. The cost-effectiveness of the film is moreover reduced by virtue of the higher consumption of coating.

In another embodiment, the thickness of the antifog coating is at least 30 nm and preferably at least 40 nm and particularly preferably at least 50 nm and at most 60 nm. In this way, the permanent antifog effect of the invention is achieved. In order to achieve the inventive transparency values of at least 93%, this embodiment must have an antireflective modification on the film side opposite to the antifog coating. This can be formed either via an antireflective coating or via an outer-layer modification with refractive index lower than that of polyethylene terephthalate.

If the antireflective modification is provided via an antireflective coating, the refractive index of this coating is lower than that of the polyester film. The refractive index at wavelength 589 nm in machine direction of the film here is below 1.64, preferably below 1.60 and ideally below 1.58. Particularly suitable materials are polyacrylates, silicones and polyurethanes, and also polyvinyl acetate. Suitable acrylates are described by way of example in EP-A-0144948, and suitable silicones are described by way of example in EP-A-0769540. Particular preference is given to coatings based on acrylates because in the greenhouse these do not have any tendency toward bleed-out of coating components and/or flaking of portions of the coating, which are phenomena more likely to occur with silicone-based coatings. It is preferable that the coating comprises copolymers of acrylate and silicone.

It is preferable that the antireflective coating is provided via an acrylate coating comprised of more than 70% by weight of methyl methacrylate and ethyl acrylate, particularly preferably more than 80% by weight of methyl methacrylate and ethyl acrylate and very particularly preferably more than 93% by weight of methyl methacrylate and ethyl acrylate repeat units. The other repeat units derive from other conventional monomers copolymerizable with methyl methacrylate, e.g. butadiene, vinyl acetate, etc. It is preferable that more than 50% by weight of the acrylate coating consists of methyl methacrylate repeat units. The acrylate coating preferably comprises less than 10% by weight, particularly preferably less than 5% by weight and very particularly preferably less than 1% by weight, of repeat units comprising an aromatic structural element. Above 10% by weight content of repeat units having an aromatic structural element, the weathering resistance of the coating is significantly impaired. It is particularly preferable that the antireflective coating comprises at least 1% by weight (based on dry weight) of a UV stabilizer, particular preference being given here to TINUVIN$^r$ 479, or TINUVIN® 5333-DW. HALS (hindered amine light stabilizers) are less preferred because in the regrind procedure (return of film residues from production) they lead to significant yellowing of the material and thus to reduced transparency. The antireflective coating can moreover consist of an acrylate-silicone copolymer or of a polyurethane (e.g. NEOREZ® R-600 from DSM Coating Resins LLC) and of a further UV stabilizer.

The thickness of the antireflective coating is at least 60 nm, preferably at least 70 nm and particularly preferably at least 80 nm, and is at most 130 nm, preferably at most 115 nm and particularly preferably at most 110 nm. An ideal transparency increase in the desired wavelength range is thus achieved. In a preferred embodiment, the thickness of the coating is more than 87 nm, and particularly preferably more than 95 nm. In this preferred embodiment, the thickness of the coating is preferably less than 115 nm and ideally less than 110 rm. Within this narrow thickness range, the transparency increase is close to the optimum and at the same time reflection of the UV and blue region of the light is increased in comparison with the remainder of the visible spectrum in this region. This firstly saves UV stabilizer, but more importantly shifts the blue/red ratio toward red. This achieves improved plant growth and increased flowering and fruiting, and reduces the incidence of stunted plant growth due to inadequate illumination.

If the antireflective modification is formed via an outer-layer modification, the outer-layer modification is formed via coextrusion on the base layer B and is located on that side of the film opposite to the antifog coating. In this case, the layer formed via the outer-layer modification is the layer C. In this case, this layer must consist of a polyester with refractive index lower than that of the polyester base layer B. The refractive index at wavelength 589 nm in machine direction of the layer C applied via coextrusion is below 1.70, preferably below 1.65 and particularly preferably below 1.60. This refractive index is achieved in that the polymer comprises a proportion of at least 2 mol % of comonomer, preferably at least 3 mol % and particularly preferably at least 6 mol %. Below 2 mol %, it is impossible to achieve the inventive values for the refractive index. The proportion of comonomer is below 20 mol %, particularly preferably below 18 mol % and particularly preferably below 16 mol %. Above 16 mol %, UV resistance becomes significantly poorer because of the amorphous nature of the layer, and above 20 mol % it is no longer possible, even with an increased quantity of UV stabilizer, to achieve the same level of UV resistance achieved below 16 mol %.

Comonomers are any of the monomers other than ethylene glycol and terephthalic acid (and, respectively, dimethyl terephthalate). The inventive proportions of comonomer are always based on the entirety of all comonomer. It is preferable not to use more than two comonomers simultaneously. Isophthalic acid is particularly preferred as comonomer. The layer C applied via coextrusion preferably comprises more than 8 mol % of IPA and particularly preferably more than 10 mol % of IPA, but less than 20 mol % of IPA, preferably less than 19 mol % and particularly preferably less than 15 mol % (in each case in relation to the dicarboxylic acid component of the polyester). A layer with comonomers content greater than 8 mol % (based on the polyester in said layer and, respectively, on the dicarboxylic acid component thereof) moreover preferably comprises at least 1.5% by weight and particularly preferably more than 2.1% by weight, of organic UV stabilizer, based on the total weight of the layer, in order to compensate for the poorer UV resistance of layers with increased comonomer content.

In a particularly preferred embodiment, a film surface has an antifog coating of thickness at least 60 nm, preferably at least 70 nm, particularly preferably at least 80 nm, and at most 150 nm, preferably at most 130 nm and ideally at most 120 nm. The refractive index of the antifog coating here at wavelength 589 run in machine direction of the film is below 1.64, preferably below 1.60 and ideally below 1.58. The film surface opposite to the antifog coating has an antireflective modification which, as already described above, can be formed either via an antireflective coating or via an outer-layer modification. It is thus particularly easy to achieve the particularly preferred transparency values of at least 94.5% and the ideal transparency values of 95%. These films exhibit very high transparency and also very good results in the cold-fog and hot-fog test, and are therefore particularly suitable for many years of use in a greenhouse.

In another particularly preferred embodiment, both film surfaces have an antifog coating of thickness at least 60 nm, preferably at least 70 nm, particularly preferably at least 80 nm and at most 150 nm, preferably at most 130 nm and ideally at most 120 nm. The refractive index of the antifog coating here at wavelength 589 nm in machine direction of the film is below 1.64, preferably below 1.60 and ideally below 1.58. By virtue of the antifog coating on both sides it is possible to achieve the preferred transparency values of at least 94.5%. By using a single coating composition, this method can be used for particularly cost-effective production of high-transparency films with very good permanent antifog properties (cold-fog and hot-fog test). This film is particularly suitable in greenhouses with a continuously high level of humidity (condensation), because the antifog coating on both sides can prevent formation of water droplets on both sides of the film surface, and thus firstly minimize transparency loss due to water droplet formation and secondly reduce burning of plants due to the lens effect of water droplets.

In order to achieve the permanent antifog effect of the invention, the film must have been equipped at least on one side with a permanent antifog coating. The good antifog properties of the surface are achieved when no formation of fine water droplets (e.g. condensation in the greenhouse) is observed on the surface of the polyester film and at the same time the coating has good wash-off resistance. A minimum precondition for good antifog properties is high surface tension and, respectively, a low contact angle α. Antifog properties are adequate when the surface tension of the antifog surface is at least 46 mN/m, preferably at least 48 mN/m and particularly preferably at least 55 mN/m. A permanent antifog effect can be achieved for a duration of at least one year in the cold-fog test and at least three months in the hot-fog test (desired ratings A and B). In the case of a multilayer embodiment with an antireflective-modified coex layer, the permanent antifog coating is applied to the film side opposite to the antireflective-modified coex layer. The antifog coating is formed via drying of a coating composition. The coating is applied homogeneously (wet application) with application weights between 1.0 and 3.0 g/m$^2$.

Use of the coating composition described below achieves the permanent antifog properties of the invention and transparency of at least 93%. The antifog coating composition of the invention is a dispersion and comprises, alongside water (continuous phase), the following components (disperse phase): a) hygroscopic porous material, b) a polymer-based crosslinking agent, c) an adhesion-promoting organofunctional silane and d) one or more surfactants.

For the production of the coating dispersion, the components a)-d) can either be used as starting material in dry form, i.e. per se (i.e. not in dissolved or dispersed condition), then being dispersed in the aqueous medium, or can respectively individually be used as starting material after predispersion or dissolution in the aqueous medium, then being mixed and optionally diluted with water. If the components a)-d) are respectively individually used after dispersion or dissolution, it has proven to be advantageous that the resultant mixture is homogenized for at least 10 minutes by a stirrer before it is used. If the components a) d) are used per se (i.e. not in dissolved or dispersed condition), it has proven to be particularly advantageous that during the dispersion procedure high shear forces are applied via use of appropriate homogenization processes.

The non-aqueous content of the dispersion is preferably in the range of 2 to 20% by weight and particularly preferably in the range from 5 to 18% by weight. Materials that can generally be used as component a) are inorganic and/or organic particles, for example amorphous silica, inorganic silicon-, aluminum- or titanium-containing alkoxides (as described in DE 69833711), kaolin, crosslinked polystyrene particles or crosslinked acrylate particles. Use of inorganic alkoxides, crosslinked polystyrene particles or crosslinked acrylate particles has proven to be disadvantageous, because an adverse effect on antifog properties was observed. Preference is given to use of porous $SiO_2$, for example amorphous silica, and also of aluminum silicates (zeolites). It is moreover possible to make additional or exclusive use of $Si_2$ nanoparticles in order to increase the wettability of the film surface, and also in order to absorb a sufficient quantity of water, so that a homogeneous water film is formed and the antifog effect is thus produced. A particularly suitable material here is ELECUT® AG 100, an aluminum silicate dispersion from Takemoto Oil and Fat Co. Ltd. (Japan). The concentration used of component a) is from 1.0 to 6.5% by weight, preferably 1.5 to 6.0% by weight. Component b) used comprises from 0.5 to 6.0% by weight, preferably from 1.0 to 5.0% by weight, of a crosslinking polymer, an acrylate, hydrophilic polyesters, polyurethane, or an oxazoline-functionalized acrylate polymer. A preferred embodiment uses an oxazoline-modified polymer (oxazoline-based crosslinking agent): the product marketed by Nippon Shokubai as EPOCROS® WS-500, and in particular EPOCROS® WS-700.

Component c) used can comprise vinyltrimethoxysilane, vinyltriethoxysilane, γ-methacryioxypropyltrimethoxysilane, or γ-glycidoxypropyltrimethoxysilane, the concentration used thereof being from 0.1 to 1.0% by weight, preferably from 0.2 to 0.7% by weight. For improved adhesion-promoting effect, particular preference is given to Z-6040 silane, a glycidoxypropyltrimethoxysilane from Dow Corning. The concentration used of the surfactant d) mentioned in the coating composition described above is from 1.5 to 7.0% by weight, preferably from 2.0 to 6.5% by weight, and this is either an ionic or preferably an anionic surfactant from the group of the alkyl sulfates, alkyl benzene sulfates or sulfosuccinic esters. Preference is given to surfactants selected from the group of the sulfosuccinic esters (sodium dioctyl sulfosuccinate), or nonionic surfactants, e.g. polysorbate 80 (polyoxyethylene(20) sorbitan monooleate), e.g. TWEEN® 80 (Sigma Aldrich), or ELECUT® AG 200 from Takemoto Oil and Fat Co. Ltd. (Japan). Addition of a quantity of from 0.01 to 0.08% by weight, preferably from 0.02 to 0.07% by weight, of a further surfactant based on alcohol alkoxylates, e.g. marketed by BYK-Chemie as BYK-DYNWET® 800, or by Air Products as SURFYNOL® 440 can improve the optical properties of the surface of the coating when an in-line application process is used.

Above the inventive limits, the viscosity of the dispersion is too high, and coating processes generally used are then unable to apply the coating homogeneously. The cost-effectiveness of the film moreover decreases because of use of an excess of coating components. Below the inventive limits, the desired antifog properties are obtained only to a restricted extent (not permanently), because the coating is less effective.

Through compliance with the inventive limits, the reaction product of the coating dispersion provides, specifically on a biaxially oriented polyester film, a good antifog effect, high wash-off resistance and high hydrophilicity.

In one embodiment, the antifog coating and/or antireflective coating is/are applied in-line during the process for production of the biaxially oriented polyester film. The coating (permanent antifog coating) or the coatings (antifog coating and antireflective coating) is/are applied here on one side or, respectively, on both sides after longitudinal stretching and before transverse stretching. In order to achieve good wetting of the polyester film by the water-based coatings, the film surface(s) is/are preferably first corona-treated. The coating(s) can be applied by a familiar suitable process, for example by a slot coater or by a spray process. It is particularly preferable to apply the coating(s) by means of the reverse gravure-roll coating process, in which the coating(s) can be applied extremely homogeneously. Preference is likewise given to application by the Meyer rod process, which can achieve relatively thick coatings. The coating components can react with one another during the drying and orientation of the polymer film and particularly during the subsequent heat treatment, temperatures during which can reach up to 240° C. The in-line process is more attractive here in terms of cost-effectiveness, because in the case of coating on both sides it is possible to apply the antifog coating and antireflective coating simultaneously, and it is therefore possible to save a process step in comparison with the off-line process.

In another preferred process, the coatings described above are applied off-line. The antireflective and/or antifog coating of the present invention is/are applied off-line here to the appropriate surfaces of the polyester film by using a gravure roll (forward gravure) in an additional process step, downstream of film production. The uppermost limits are set via the process conditions and the viscosity of the coating dispersion, and the upper limit of these derives from the processability or the coating dispersion. It has proven to be disadvantageous to apply the antifog coating onto an undercoat (antifog coating onto an antireflective coating), because firstly the consumption of material increases and secondly a further process step is required, with resultant reduction of the cost-effectiveness of the film. Some in-line coating processes are unable to achieve the particularly preferred coating thicknesses because of the high viscosity of the coating dispersion. In that case it is advisable to select the off-line coating process, because it can process dispersions with lower solids contents and higher wet-application weights, with resultant easier processing. Off-line coatings can moreover achieve greater coating thicknesses, and this has proven to be advantageous for applications with a stringent requirement placed upon the lifetime of the antifog coating: coating thicknesses greater than 80 nm can be achieved particularly easily by the off-line process, and it is thus possible to achieve a better permanent antifog effect, but no further increase of transparency.

Production Process

The polyester polymers of the individual layers are produced by polycondensation, either starting from dicarboxylic acids and diol or else starting from the esters of the dicarboxylic acids, preferably the dimethyl esters, and diol. SV values of polyesters that can be used are in the range of 500 to 1300, the individual values here being relatively unimportant, but the average SV value of the raw materials used must be greater than 700 and is preferably greater than 750.

The particles, and also UV stabilizers, can be added before production of the polyester is completed. To this end, the particles are dispersed in the diol, optionally ground, decanted or/and filtered, and added to the reactor either in the (trans)esterification step or in the polycondensation step. It is preferably possible to use a twin-screw extruder to produce a concentrated particle-containing or additive-containing polyester masterbatch and to use particle-free polyester for dilution during film extrusion. It has proven to be advantageous here to avoid using any masterbatches comprising less than 30% by weight of polyester. In particular, the masterbatch comprising $SiO_2$ particles should 0.5 have no more than 20% by weight content of $SiO_2$ (risk of gelling). Another possibility consists in addition of particles and additives directly during film extrusion in a twin-screw extruder.

If single-screw extruders are used, it has then proven to be advantageous to predry the polyesters. The drying step can be omitted when a twin-screw extruder with devolatilization zone is used.

The polyester, or the polyester mixture of the layer, or of the individual layers in the case of multilayer films, is firstly compressed and plastified in extruders. The melt(s) is/are then shaped in a single-layer or coextrusion die to give flat melt films, forced through a flat-film die, and drawn off on a chill roll and one or more take-off rolls, whereupon it cools and solidifies.

The film of the invention is biaxially oriented, i.e. biaxially stretched. The biaxial orientation of the film is most often carried out sequentially. In this case, orientation is preferably carried out firstly in longitudinal direction (i.e. in machine direction=MD) and then in transverse direction (i.e. perpendicularly to machine direction=TD). The orientation in longitudinal direction can be carried out with the aid of two rolls running at different speeds corresponding to the desired stretching ratio. For the transverse orientation, use is generally made of an appropriate tenter frame.

The temperature at which the stretching is carried out can vary relatively widely and depends on the desired properties of the film. The stretching is generally carried out in longitudinal direction in a temperature range from 80 to 130° C. (heating temperatures from 80 to 130° C.) and in transverse direction in a temperature range from 90° C. (start of stretching) to 140° C. (end of stretching). The longitudinal stretching ratio is in the range from 2.5:1 to 4.5:1, preferably from 2.8:1 to 3.4:1. A stretching ratio above 4.5 leads to significantly impaired ease of production (break-offs). The transverse stretching ratio is generally in the range from 2.5:1 to 5.0:1, preferably from 3.2:1 to 4:1. A transverse stretching ratio higher than 4.8 leads to significantly impaired ease of production (break-off) and should therefore preferably be avoided. For achievement of the desired film properties, it has proven advantageous that the stretching temperature (in MD and TD) is below 125° C. and preferably below 118° C. Before the transverse stretching, one or both surface(s) of the film can be coated in-line by the processes known per se. The in-line coating can preferably be utilized in order to apply a (antireflective) coating intended to increase transparency. During the heat-setting that follows, the film is kept at a temperature of from 150 to 250° C. for a period of about 0.1 to 10 s, under tension, and in order to achieve the preferred shrinkage and elongation values is relaxed by at least 1%, preferably at least 3% and particularly preferably at least 4% in transverse direction. This relaxation preferably takes place in a temperature range from 150 to 190° C. In order to reduce transparency bow, the temperature in the first setting zone is preferably below 220° C. and particularly preferably below 190° C. For the same reason, at least 1%, preferably at least 2%, of the total transverse stretching ratio should preferably moreover relate to the first setting zone, where no further stretching usually takes place. The film is then wound up in conventional manner.

In a particularly cost-effective mode of production of the polyester film, a quantity of up to 60% by weight, based on the total weight of the film, of the chopped material (regrind) can be returned to the extrusion process, without any resultant significant adverse effect on the physical properties of the film.

Other Film Properties

After the process described above, the shrinkage of the film of the invention through 150° C. in longitudinal and transverse direction is preferably below 5%, preferably below 2% and particularly preferably below 1.5%. The expansion of this film at 100° C. is moreover less than 3%, preferably less than 1% and particularly preferably less than 0.3%. This dimensional stability can be obtained by way of example via suitable relaxation of the film before wind-up. This dimensional stability is important in order that subsequent shrinkage of the strips is avoided during the use in energy-saving blinds; said shrinkage would lead to increased passage of air between the strips (reduced energy-saving effect). Not only in roller-blind production but also in the case of energy-saving blinds, excessive shrinkage and excessive expansion lead to overstretching effects in the manner of corrugations in the finished products.

The modulus of elasticity of the film of the invention is moreover greater than 3000 N/mm$^2$ in both film directions in longitudinal and transverse direction, and preferably greater than 3500 N/mm$^2$ and particularly preferably (in at least one film direction)>4500 N/mm$^2$. The F5 values (force at 5% elongation) in longitudinal and transverse direction are preferably above 80 N/mm$^2$ and very particularly preferably above 90 N/mm$^2$. These mechanical properties can be established and maintained via variation of the parameters for the biaxial stretching of the film within the scope of the process conditions stated above. When films with the mechanical properties mentioned are used under tension, they do not suffer excessive overstretching and remain amenable to good directional control.

For achievement of the transparency values of the invention, it has moreover proven to be advantageous that the haze of the film is less than 20%, preferably less than 18% and ideally less than 15%. As haze decreases, back-scattering of light also decreases, as therefore also does loss of transparency. Compliance with the particle contents of the invention and polymer composition of the invention achieves these haze values.

Use

The films of the invention have excellent suitability as high-transparency convection barrier, in particular for the production of energy-saving blinds in greenhouses. The film here is usually cut into narrow strips from which, in combination with polyester yarn (which must also be UV-resistant), a woven fabric/laid scrim is then produced, which is suspended in a greenhouse. The strips made of film of the invention can be combined here with strips made of other films (in particular with films providing a light-scattering effect or further transparency increase).

Alternatively, the film per se (without textile) can be installed in a greenhouse.

Analysis

The following test methods were used to characterize the raw materials and the films:

Uv/Vis Spectra and Transmittance at Wavelength X

The films were tested in transmission in a (LAMBDA® 12 or 35) UV/Vis double-beam spectrometer from Perkin Elmer USA. To this end, a flat sample holder was used to insert a film specimen measuring about (3×5) cm into the beam path, perpendicularly to the measurement beam. The measurement beam passes by way of a 50 mm Ulbricht sphere onward to the detector, where intensity is determined in order to determine transparency at a desired wavelength. Air is used as background. Transmittance is read at the desired wavelength.

Haze/Transparency

The test serves to determine haze and transparency of plastics films where optical clarity and, respectively, haze is significant for functional value. The measurement is made in accordance with ASTM D1003-61 in a HAZE-GARD® haze meter XL-21 1 from BYK Gardner. Transparency was measured in accordance with ASTM-D1003-61 (method A) by means of a HAZE-GARD PLUS® from BYK-Gardner GmbH Germany.

SV Value (Standard Viscosity)

Standard viscosity in dilute solution SV was measured by a method based on DIN 53 728 part 3, at (25±0.05) ° C. in an Ubbelohde viscometer. Dichloroacetic acid (DCA) was used as solvent. The concentration of the dissolved polymer was 1 g of polymer/100 ml of pure solvent. Dissolution of the polymer took one hour at 60° C. If after this time the samples were not completely dissolved, up to two further dissolution attempts were made, in each case for 40 minutes at 80° C., and the solutions were then centrifuged for one hour at a rotation rate of 4100 min⁻.

The dimensionless SV value is determined as follows from the relative viscosity ($\eta_{rel}=\eta/\eta_s$):

$$SV=(\eta_{rel}-1)\times 1000$$

The content of particles in the film or polymer raw material was determined by ashing and corrected by increasing input weight accordingly, i.e.:

input weight=(input weight corresponding to 100% of polymer)/[(100−particle content in % by weight)/100]

Mechanical Properties

Mechanical properties were determined by way of a tensile test by a method based on DIN EN ISO 572-1 and -3 (specimen type 2) on film strips measuring 100 mm×15 mm.

Shrinkage

The thermal shrinkage was determined on square film samples with edge length 10 cm. The samples were cut out in such a way that one edge ran parallel to machine direction and one edge ran perpendicularly to machine direction. The samples were measured precisely (the edge length $L_0$ being determined for each machine direction TD and MD to give $L_{0\ TD}$ and $L_{0\ MD}$) and heat-treated at the stated shrinkage temperature (in this case 150° C.) for 15 min in a convection drying oven. The samples were removed and measured precisely at room temperature (edge length $L_{TD}$ and $L_{MD}$). Shrinkage is obtained from the following equation:

$$\text{shrinkage [\%] } MD=100\cdot(L_{0\ MD}-L_{MD})/L_{0\ MD} \text{ and, respectively,}$$

$$\text{shrinkage [\%] } TD=100\cdot(L_{0\ TD}-L_{TD})/L_{0\ TD}$$

Expansion

Thermal expansion was determined on square film samples with edge length 10 cm. The samples were measured precisely (edge length $L_0$), heated for 15 minutes at 100° C. in a convection drying oven, then measured precisely at room temperature (edge length L). Expansion is obtained from the following equation:

$$\text{expansion [\%]}=100*(L-L_0)/L_0$$

and was determined separately in each film direction.

UV Resistance

UV resistance was determined as described on page 8 of DE69731750 (DE version of WO9806575), and the UTS value was stated in % of the initial value, the weathering time being 2000 h rather than 1000 h.

Flame Retardancy

A piece of film measuring 30*30 cm was held at the corners by two clamps and suspended vertically. A point generally requiring attention is exclusion, at the location where the sample is suspended, of any air movement that causes noticeable movement of the piece of film. Extraction of air from above at a low flow rate is acceptable here. A flame was then applied from below in the middle of the lower side of the piece of film. The flame can be applied by using a commercially available cigarette lighter, or preferably a Bunsen burner. The length of the flame here must be more than 1 cm and less than 3 cm. The flame was kept in contact with the film until the latter continued to burn (for at least three seconds) in the absence of the ignition flame. However, the maximal time for which the flame was kept in contact with the film, and moved to retain contact with the burning/shrinking film, was five seconds. Four ignition procedures were carried out.

Flame retardancy is evaluated in the examples cited here by using the following grades:

1=during four ignition procedures, ignition of the film never continued for longer than three seconds.

2=the film ignited and after less than 15 seconds self-extinguished, and more than 30% of the area of the film remained.

3=the film ignited and after less than 20 seconds self-extinguished, and more than 30% of the area of the film remained.

4=the film ignited and after less than 40 seconds self-extinguished, and more than 30% of the area of the film remained.

5=the film ignited and after less than 40 seconds self-extinguished, and more than 10% of the area of the film remained.

6=the film ignited and burned for more than 40 seconds, or after self-extinguishment less than 10% of the area of the film remained.

Determination of the Refractive Index as a Function of Wavelength

The refractive index of a film substrate and of an applied coating was determined by spectroscopic ell ipsometry as a function of wavelength.

J. A. Woollam et al., Overview of variable-angle spectroscopic ellipsometry (VASE: I. Basic theory and typical applications, Proc. SPIE vol. CR72, pp. 3-28, Optical Metrology, Ghanim A. Al-Jumaily; ed.

To this end, the base film without coating or modified coex side is first analyzed. Reverse-side reflection is suppressed by using an abrasive paper with the smallest possible particle diameter (for example P1000) to roughen the reverse side of the film. The film is then subjected to measurement by a spectroscopic ellipsometer, in this case an M-2000 from J. A. Woollam Co., Inc., equipped with a rotating compensator. The machine direction of the sample is parallel to the light beam. The wavelength used for measurement is in the range from 370 to 1000 nm, and the measurement angle is 65, 70 and 75°.

A model is then used to simulate the ellipsometric data $\Psi$ and $\Delta$. The Cauchy model $$n(\lambda) = A + \frac{B}{\lambda^2} + \frac{C}{\lambda^4}$$

(wavelength $\lambda$ in μm) is suitable for this purpose in the present case. The parameters A, B and C are varied in such a way that the data provide the best possible fit with $\Psi$ and $\Delta$ in the measured spectrum. The validity of the model can be checked by using the MSE value, which compares model with measured data ($\Psi(\lambda)$ and $\Delta(\lambda)$) and should be as small as possible.

$$MSE = \sqrt{\frac{1}{3n-m}\sum_{i=1}^{n}[(N_{E,i}-N_{G,i})^2 + (C_{E,i}-C_{G,i})^2 + (S_{E,i}-S_{G,i})^2]} \cdot 100$$

$n$=number of wavelengths,$m$=number of fit parameters,$N$=cos(2$\Psi$),$C$=sin(2$\Psi$)cos($\Delta$),$S$=sin(2$\Psi$)sin($\Delta$)   [1]

The Cauchy parameters A, B and C obtained for the base film allow calculation of the refractive index n as a function of wavelength, with validity in the range of measurement from 370 to 1000 nm.

The coating, or a modified coextruded layer, can be analyzed analogously. The parameters of the film base are now already known, and should be kept constant in the modeling procedure. Determination on the coating or on the coextruded layer also requires roughening of the reverse side of the film, as described above. The Cauchy model can likewise be used here to describe the refractive index as a function of wavelength. However, the respective layer is now present on the already known substrate, and this is taken into account in the relevant evaluation software (COMPLETEEASE® or WVASE®). The thickness of the layer influences the spectrum obtained, and must be taken into account in the modeling procedure.

Surface Tension

Surface tension (surface free energy) was calculated from the contact angles by means of the Owens-Wendt-Rabel-Kaelble method in accordance with DIN 5560-1,2. Water, 1,5-pentanediol and diiodomethane are used as test liquids. A DSA-100 tester from Kruss GmbH, Germany was used to determine the contact angles. The DSA software (2005 issue) associated with the equipment was used for evaluation by the Owens-Wendt-Rabel-Kaelble method. Gebhardt values were adopted for the polar and disperse component for 1,5-pentanediols, and Ström values were adopted for water and diiodomethane.

|  | IFT in mN/m | Disperse in mN/m | Polar in mN/m |
| --- | --- | --- | --- |
| Water | 72.8 | 21.8 | 51 |
| 1,5-Pentanediol | 43.3 | 27.6 | 15.7 |
| Diiodomethane | 50.8 | 50.8 | 0 |

Measurement of Contact Angle α

A static contact angle measurement for distilled water in accordance with DIN 55660-1,2 is used as a measure of the hydrophilicity of the film surface (A). A DSA-100 tester from KrUss GmbH with version 4 software is used for the measurement on static droplets (B). The value is determined at 23° C. and 50% relative humidity on film samples which have no electrical charge and have been preconditioned for at least 16 hours under standard conditions of temperature and humidity. An ME41 automated metering syringe is used to apply from
3-5 μl of distilled water to the film surface. Over a period of 20 seconds, the contact angle α is determined automatically every 5 seconds. The measurement is made on 4 droplets, and the average value of the contact angle α is calculated from the 16 individual values.

Determination of Antifog Effect

Cold-fog test: The antifog properties of the polyester films are determined as follows: in a laboratory controlled to 23° C. and 50% relative humidity, film samples were sealed onto a ready-meal tray (length about 17 cm, width about 12 cm, height about 3 cm) made of amorphous polyethylene terephthalate (=APET) comprising about 50 ml of water. The trays were stored in a refrigerator controlled to 4° C. and placed at an angle of 30°, and removed for assessment after respectively 12 h, 24 h, 1 week, 1 month and 1 year. The test studies formation of condensate when the warm air at 23° C. is cooled to refrigerator temperature. A film equipped with an effective antifog agent remains transparent after formation of condensate, because the condensate forms a coherent, transparent film. In the absence of effective antifog agent, formation of a fine droplet mist on the film surface leads to reduced transparency of the film; in the most disadvantageous case, the contents of the ready-meal tray are no longer visible.

The test known as the hot-steam test or hot-fog test provides another investigation method. For this, a QCT condensation tester from Q-lab is used. This simulates the fogging effects of moisture under outdoor conditions, in that warm water condenses directly on the film. It is therefore possible within a few days or weeks to reproduce results caused by moisture over a period of months or years. For this, the water in the QCT condensation device is controlled to 60° C. and the film is clamped in the appropriate holder. The angle of inclination of the clamped film here is about 30°. The assessment procedure is the same as described above. With this test it is possible to test the long-term antifog effect of the film and its wash-off resistance, because the steam condenses on the film continuously and in turn runs off and/or drips off. Readily soluble substances are thus washed off, and the antifog effect decreases. This test is likewise carried out in a laboratory controlled to 23° C. and 50% relative humidity.

The antifog effect (antifog test) is assessed visually.

Rating:

A=Excellent: completely transparent film revealing no visible water

B=Acceptable: some occasional, irregularly distributed water droplets on the surface, non-continuous water film C=Poor: complete layer of large transparent water droplets, poor film transparency, lens formation, droplet formation D=Very poor: opaque or transparent layer of large water droplets, no film transparency, poor translucency.

Examples

The working examples below serve for further explanation of the invention, which is not restricted thereto. Instead, all of the features mentioned can be freely combined in any form that appears to the person skilled in the art to be suitable, and all of these forms are comprised by the present invention.

The invention is explained in more detail below with reference to examples.

Inventive examples 1-9 and

Comparative examples CE1-7

The polymer mixtures were melted at 292° C. and, after passage through a flat-film die, laid electrostatically onto a chill roll controlled to 50° C. The raw materials below were melted in one extruder per layer, and extruded onto a chilled take-off roll after passage through a three-layer flat-film die. The resultant amorphous prefilm was then first stretched longitudinally. The longitudinally stretched film was corona-treated in a corona discharge device and then coated, via reverse-gravure coating, with the dispersion below. The film was then transversely stretched, set and rolled up. The conditions in the individual steps were:

| Longitudinal stretching | Heating temperature | 75-115 | ° C. |
| --- | --- | --- | --- |
|  | Stretching temperature | 115 | ° C. |
|  | Longitudinal stretching ratio | 3.8 |  |

-continued

| | | | |
|---|---|---|---|
| Transverse stretching | Heating temperature | 100 | ° C. |
| | Stretching temperature | 112 | ° C. |
| | Transverse stretching ratio (inclusive of stretching in 1st setting zone) | 3.9 | |
| Setting | Temperature | 237-150 | ° C. |
| | Duration | 3 | s |
| | Relaxation in TD at from 200-150° C. | 5 | % |
| Setting | Temperature in 1st setting zone | 170 | ° C. |

The following starting materials were used to produce the films described below:

PET1=polyethylene terephthalate raw material from ethylene glycol and terephthalic acid with SV value 820 and DEG content 0.9% by weight (diethylene glycol content as monomer).

PET2=polyethylene terephthalate raw material with SV value 700, comprising 20% by weight of TINUVIN® 1577. The composition of the UV stabilizer is: 2-(4,6-diphenyl-1,3,5-triazin-2-yl)-5-(hexyl) oxyphenol (TINUVIN® 1577 from BASF, Ludwigshafen, Germany). The melting point of Tinuvin® 1577 is 149° C. and it is thermally stable at 330° C.

PET3=polyethylene terephthalate raw material with SV 700 and 15% by weight of SYLYSIA® 310 P silicon dioxide particles with d50 2.7 µm (produced by FUJI SILYSIA CHEMICAL LTD. Greenville N.C./USA). The SiO$_2$ was incorporated into the polyethylene terephthalate in a twin-screw extruder.

PET4=polyethylene terephthalate raw material with SV value 710, comprising 25 mol % of isophthaiic acid as comonomers.

Composition of the Coating Dispersion
Coating 1:
The following composition was used for the coating solution:
  88.95% by weight of deionized water
  3.50% by weight of ELECUT® AG 100 (16.5% by weight, Takemoto Oil and Fat Co. Ltd.)
  4.50% by weight of ELECUT® AG 200 (13.5% by weight, Takemoto Oil and Fat Co. Ltd.)
  2.50% by weight of EPOCRO® WS-700 (25% by weight, Nippon Shokubai)
  0.50% by weight of Z-6040 (90-100% by weight, Dow Corning)
  0.05% by weight of BYK-DYNWET® 800 (100% by weight, BYK-Chemie GmbH)

The individual components were slowly added, with stirring, to deionized water and stirred for at least 30 min before use.

Coating 2:
The following composition was used for the coating solution:
  88.45% by weight of deionized water
  2.50% by weight of Elecut® AG 100 (16.5% by weight, Takemoto Oil and Fat Co. Ltd.)
  3.50% by weight of Elecut® AG 200 (13.5% by weight, Takemoto Oil and Fat Co. Ltd.)
  5.00% by weight of EPOCROS® WS-700 (25% by weight, Nippon Shokubai)
  0.50% by weight of Z-6040 (90-100% by weight, Dow Corning)
  0.05% by weight of BYK-DYNWET® 800 (100% by weight, BYK-Chemie GmbH)

The individual components were slowly added, with stirring, to deionized water and stirred for at least 30 min before use.

Unless otherwise stated, the coatings are applied in the in-line process. Table 1 below collates the formulations, production conditions and resultant film properties:

TABLE 1

Properties of the films of the inventive examples

| | | Inv. ex. 1 | Inv. ex. 2 | Inv. ex. 3 | Inv. ex. 4 | Inv. ex. 5 | Inv. ex. 6 | Inv. ex. 7 | Inv. ex. 8 | Inv. ex. 9 |
|---|---|---|---|---|---|---|---|---|---|---|
| Layer | Film thickness | 15 | 15 | 15 | 15 | 15 | 15 | 15 | 15 | 15 |
| | Thickness A | 0.8 | 0.8 | 0.8 | 0.8 | 0.8 | 0.8 | 0.8 | 0.8 | 0.8 |
| | Thickness B | 13.4 | 13.4 | 13.4 | 13.4 | 13.4 | 13.4 | 13.4 | 13.4 | 13.4 |
| | Thickness C | 0.8 | 0.8 | 0.8 | 0.8 | 0.8 | 0.8 | 0.8 | 0.8 | 0.8 |
| Coating on side A | | Dry thickness 65 nm. Antifog coating 1 | Dry thickness 65 nm. Antifog coating 2 | Dry thickness 65 nm. Antifog coating 2 | Dry thickness 65 nm. Antilog coating 1 | Dry thickness 130 nm. Antifog coating 1 (off-line process) | Dry thickness 130 nm. Antifog coating 1 (off-line process) | Dry thickness 65 nm. Antifog coating 1 | Dry thickness 40 nm. Antifog coating 1 | Dry thickness 40 mn. Antifog coating 1 |
| Coating on side C | | | | | Dry thickness 75 mn. Actylate coating and application method as in Example 1 of EP0144948 | | Dry thickness 150 nm. Acrylate coating and application method as in Example 1 of EP0144948 (off-line process) | Dry thickness 65 nm. Antifog coating 1 | | Dry thickness 75 mn. Acrylate coating and application method as in Example 1 of EP0144948 |
| Layer A | PET 1 | 89 | 89 | 89 | 89 | 89 | 89 | 89 | 89 | 89 |
| | PET 2 | 10 | 10 | 10 | 10 | 10 | 10 | 10 | 10 | 10 |
| | PET 3 | 1 | 1 | 1 | 1 | 1 | 1 | 1 | 1 | 1 |
| | PET 4 | | | | | | | | | |

TABLE 1-continued

Properties of the films of the inventive examples

|  |  | Inv. ex. 1 | Inv. ex. 2 | Inv. ex. 3 | Inv. ex. 4 | Inv. ex. 5 | Inv. ex. 6 | Inv. ex. 7 | Inv. ex. 8 | Inv. ex. 9 |
|---|---|---|---|---|---|---|---|---|---|---|
| Layer B | PET 1 | 95 | 95 | 95 | 95 | 95 | 95 | 95 | 95 | 94.2 |
|  | PET 2 | 5 | 5 | 5 | 5 | 5 | 5 | 5 | 5 | 5 |
| Layer C | PET 1 | 34 | 34 | 89 | 89 | 34 | 89 | 89 | 34 | 89 |
|  | PET 2 | 15 | 15 | 10 | 10 | 15 | 10 | 10 | 15 | 10 |
|  | PET 3 | 1 | 1 | 1 | 1 | 1 | 1 | 1 | 1 | 1 |
|  | PET 4 | 50 | 50 |  |  | 50 |  |  | 50 |  |
| Transparency (middle of web) | in % | 93.2 | 93.8 | 93.0 | 95.0 | 94.0 | 95.5 | 95.3 | 93.1 | 94.5 |
| Haze |  | 10.5 | 9.8 | 13.0 | 13.0 | 15.5 | 17.8 | 17.8 | 10.5 | 9.8 |
| UV resistance UTS | in % | 70 | 64 | 65 | 65 | 64 | 63 | 63 | 70 | 64 |
| Flame test | Grades | 4 | 4 | 4 | 4 | 4 | 4 | 4 | 4 | 4 |
| Modulus of elasticity in MD | N/mm$^2$ | 4360 | 3950 | 3950 | 3950 | 4000 | 4100 | 4100 | 4360 | 3950 |
| Modulus of elasticity in TD | N/mm$^2$ | 4800 | 4350 | 4300 | 4300 | 4500 | 4550 | 4550 | 4800 | 4350 |
| F5 in MD | N/mm$^2$ | 110 | 115 | 104 | 104 | 105 | 1015 | 1015 | 110 | 115 |
| F5 in TD | N/mm$^2$ | 110 | 100 | 117 | 117 | 115 | 102 | 102 | 110 | 100 |
| Shrinkage in MD | in % | 1.5 | 1.3 | 1.3 | 1.3 | 1.5 | 1.4 | 1.4 | 1.5 | 1.3 |
| Shrinkage in TD | in % | 0.1 | 0.4 | 0.4 | 0.4 | 0.3 | 0.2 | 0.2 | 0.1 | 0.4 |
| Expansion in MD at 100° C. | in % | 0.1 | 0 | 0 | 0 | −0.2 | 0 | 0 | 0.1 | 0 |
| Expansion in TD at 100° C. | in % | 0 | 0 | 0 | 0 | 0 | 0.1 | 0.1 | 0 | 0 |
| SV of film |  | 738 | 728 | 738 | 738 | 740 | 735 | 735 | 738 | 728 |
| Surface tension σ(overall) side A | [mN/m] | 58.4 | 50.5 | 55.6 | 55.6 | 56.4 | 56.5 | 56.5 | 58.4 | 50.5 |
| Cold-fog test |  | A | A | A | A | A | A | A* | B | B |
| Hot-fog test |  | A | B | B | A | A | A | A* | B | B |
| Comment |  |  |  |  |  |  |  | *Results apply to both film sides |  |  |

Comparative Examples

Coating 3

Coating as in EP 1777251 A1, consisting of a hydrophilic coating where the drying product of the coating composition comprises water, a sulfopolyester, a surfactant and optionally an adhesion-promoting polymer. These films have a hydrophilic surface which prevents short-term fogging of the films by water droplets. The following composition was used for the coating solution:

- 1.0% by weight of sulfopolyester (copolyester from 90 mol % of isophthalic acid and 10 mol % of sodium sulfoisophthalic acid and ethylene glycol)
- 1.0% by weight of acrylate copolymer consisting of 60% by weight of methyl methacrylate, 35% by weight of ethyl acrylate and 5% by weight of N-methylolacrylamide
- 1.5% by weight of sodium salt of diethylhexyl sulfosuccinate (LUTENSIT® A-BO BASF AG).

TABLE 2

Properties of the films of the comparative examples:

|  |  | CE1 | CE2 | CE3 | CE4 | CE 5 | CE 6 | CE 7 |
|---|---|---|---|---|---|---|---|---|
| Layer | Film thickness | 15 | 15 | 15 | 15 | 15 | 15 | 15 |
|  | Thickness A | 0.8 | 0.8 | 0.8 | 0.8 | 0.8 | 0.8 | 0.8 |
|  | Thickness B | 13.4 | 13.4 | 13.4 | 13.4 | 13.4 | 13.4 | 13.4 |
|  | Thickness C | 0.8 | 0.8 | 0.8 | 0.8 | 0.8 | 0.8 | 0.8 |

TABLE 2-continued

Properties of the films of the comparative examples:

|  |  | CE1 | CE2 | CE3 | CE4 | CE 5 | CE 6 | CE 7 |
|---|---|---|---|---|---|---|---|---|
| Coating on side A |  | Dry thickness 40 nm. Antifog coating 3 (in-line) | Dry thickness 40 nm. Antifog coating 3 (in-line) | Dry thickness 40 nm. Antifog coating 3 (off-line) | Dry thickness 40 nm. Antifog coating 3 (off-line) | Dry thickness 25 nm. Antifog coating 1 | Dry thickness 40 nm. Antifog coating 1 | Dry thickness 25 nm. Antifog coating 1 |
| Coating on side C |  |  |  |  | Dry thickness 75 nm. Acrylate coating and application method as in Example 1 of EP0144948 |  |  | Dry thickness 75 nm. Acrylate coating and application method as in Example 1 of EP0144948 |
| Layer A | PET 1 | 89 | 89 | 89 | 89 | 89 | 89 | 89 |
|  | PET 2 | 10 | 10 | 10 | 10 | 10 | 10 | 10 |
|  | PET 3 | 1 | 1 | 1 | 1 | 1 | 1 | 1 |
|  | PET 4 |  |  |  |  |  |  |  |
| Layer B | PET 1 | 95 | 95 | 95 | 95 | 95 | 95 | 95 |
|  | PET 2 | 5 | 5 | 5 | 5 | 5 | 5 | 5 |
| Layer C | PET 1 | 34 | 89 | 89 | 89 | 34 | 89 | 89 |
|  | PET 2 | 15 | 10 | 10 | 10 | 15 | 10 | 10 |
|  | PET 3 | 1 | 1 | 1 | 1 | 1 | 1 | 1 |
|  | PET 4 | 50 |  |  |  | 50 |  |  |
| Transparency (middle of web) | in % | 92.3 | 91.6 | 91.8 | 94.4 | 92.5 | 91.8 | 94.3 |
| Haze |  | 10.2 | 10.9 | 11.3 | 11.0 | 11.8 | 11.8 | 11.8 |
| UV resistance UTS | in % | 65 | 70 | 64 | 65 | 65 | 65 | 65 |
| Flame test | Grades | 4 | 4 | 4 | 4 | 4 | 4 | 4 |
| Modulus of elasticity in MD | N/mm$^2$ | 4250 | 4300 | 3900 | 4000 | 4200 | 4200 | 4200 |
| Modulus of elasticity in TD | N/mm$^2$ | 4820 | 4750 | 4400 | 4350 | 4750 | 4750 | 4750 |
| F5 in MD | N/mm$^2$ | 100 | 115 | 110 | 118 | 103 | 103 | 103 |
| F5 in TD | N/mm$^2$ | 112 | 105 | 113 | 117 | 112 | 112 | 112 |
| Shrinkage in MD | in. % | 1.4 | 1.7 | 1.5 | 1.3 | 1.4 | 1.4 | 1.4 |
| Shrinkage in TD | in % | 0.4 | 0.1 | 0.4 | −0.1 | 0.3 | 0.3 | 0.3 |
| Expansion in MD at 100° C. | in % | 0 | 0.1 | 0 | 0 | 0 | 0 | 0 |
| Expansion in TD at 100° C. | in % | 0.1 | 0 | 0 | 0 | 0.1 | 0.1 | 0.1 |
| SV of film |  | 720 | 738 | 728 | 738 | 720 | 720 | 720 |
| Surface tension σ(overall) (side A) | [mN/m] | 46.7 | 49.8 | 51.5 | 50.2 | 45.4 | 58.2 | 45.4 |
| Cold-fog test |  | C | C | C | C | B | B | B |
| Hot-fog test |  | D | D | D | D | C | B | C |
| Comment |  |  |  |  |  |  |  |  |

That which is claimed is:

1. A coated polyester film with transparency of at least 93% comprising:
   at least one base layer B which comprises a thermoplastic polyester and a UV stabilizer;
   where the polyester film has a first and a second surface, where a permanent antifog coating has been applied on at least one of the surfaces of the polyester film,
   wherein the permanent antifog coating has a refractive index that is lower than that of the base layer B, and is crosslinked,
   wherein said permanent antifog coating is a reaction product of a dispersion of an antifog-coating composition that comprises, alongside water, a) hygroscopic, porous material, b) a crosslinking agent based on polymer, c) an adhesion-promoting organofunctional silane and d) one or more surfactants wherein the concentration of said hygroscopic, porous material is from 1 to 6.5% by weight; and wherein the concentration of said crosslinking agent is from 0.5 to 6% by weight; and wherein the concentration of said adhesion-promoting organofunctional silane is from 0.1 to 1% by weight; and wherein the concentration of said one or more surfactants is from 1.5 through 7% by weight based on the weight of said permanent antifog coating.

2. The polyester film as claimed in claim 1, wherein the polyester film is a multilayer film and comprises a layer A which has been applied on the base layer, or comprises a layer A and a layer C, where the base layer B is arranged between the layer A and the layer C, and where the layers A and C comprise a thermoplastic polymer and a UV stabilizer.

3. The polyester film as claimed in claim 1, wherein the thickness of the polyester film is at least 10 µm and at most 40 µm.

4. The polyester film as claimed in claim 3, wherein the thickness of the polyester film is at least 14 µm and at most 23 µm.

5. The polyester film as claimed in claim 1, wherein at least 70% by weight of the base layer B consists of the thermoplastic polyester, where at least 85 mol % of the thermoplastic polyester consists of ethylene-glycol- and terephthalic-acid-derived units.

6. The polyester film as claimed in claim 5, wherein at least 70% by weight of the base layer B consists of the thermoplastic polyester, where at least 90 mol % of the thermoplastic polyester consists of ethylene-glycol- and terephthalic-acid-derived units.

7. The polyester film as claimed in claim 1, wherein the SV value of the polyester film is greater than 600 and less than 950.

8. The polyester film as claimed in claim 7, wherein the SV value of the polyester film is greater than 650 and less than 850.

9. The polyester film as claimed in claim 1, wherein the UV stabilizer is selected from the group consisting of triazines, benzotriazoles, and benzoxazinones, where the base layer B and, optional layer A and further optional layer C if present, comprise a quantity of from 0.3 to 3% by weight of the UV stabilizer, based on the weight of the respective layer.

10. The polyester film as claimed in claim 9, wherein the UV stabilizer is triazine, where the base layer B and optional layer A and further optional layer C comprise from 0.75 to 2.8% by weight of the UV stabilizer, based on the weight of the respective layer.

11. The polyester film as claimed in claim 1, wherein the permanent antifog coating has been applied on the first or the second surface of the polyester film and that surface of the polyester film that is opposite to the antifog coating has an antireflective modification which
(1) is an antireflective coating comprising polyacrylates, silicones, polyurethanes, polyvinyl acetate, acrylate-silicone or polyurethane, or
(2) is formed via an outer-layer modification.

12. The polyester film as claimed in claim 1, wherein the film further comprises an outer-layer modification formed via coextrusion on the base layer B, where the outer-layer modification comprises a polyester having a lower refractive index than the polyester of the base layer B.

13. The polyester film as claimed in claim 12, wherein the outer-layer modification has a comonomers content of the polyester of the outer-layer modification of at least 2 mol %.

14. The polyester film as claimed in claim 13, wherein the comonomers content of the polyester of the outer-layer modification is at least 3 mol %.

15. The polyester film as claimed in claim 1, wherein the thickness of the permanent antifog coating is at least 60 nm and at most 150 nm.

16. The polyester film as claimed in claim 15, wherein the thickness of the permanent antifog coating is at least 70 nm and at most 130 nm.

17. The polyester film as claimed in claim 1, wherein the thickness of the permanent antifog coating is at least 30 nm and at most 60 nm.

18. The polyester film as claimed in claim 17, wherein the thickness of the permanent antifog coating is at least 40 nm.

19. The polyester film as claimed in claim 1, wherein the permanent antifog coating further comprises from 1.5 to 7.0% by weight of one or more surfactants.

20. The polyester film as claimed in claim 1, wherein the hygroscopic, porous material is aluminum silicate and/or amorphous silica.

21. The polyester film as claimed in claim 1, wherein the antifog-coating composition consists of, alongside water, a) hygroscopic, porous material, b) a crosslinking agent based on polymer, c) an adhesion-promoting organofunctional silane and d) one or more surfactants.

22. The polyester film as claimed in claim 11, wherein the antireflective coating is an acrylate coating comprising less than 10% by weight of repeat units comprising an aromatic structural element.

23. A convection barrier comprising the coated polyester film as claimed in claim 1.

24. Energy-saving blinds in greenhouses comprising the coated polyester film as claimed in claim 1.

25. A process for the production of a coated polyester film as claimed in claim 1 comprising
producing polyester film by extrusion;
biaxially stretching the film;
applying an antifog-coating composition to the film via in-line wet application;
heat-setting and winding-up the coated polyester film.

26. A process for the production of a coated polyester film as claimed in claim 1 comprising
producing polyester film by extrusion;
biaxially stretching the film;
heat-setting the stretched film;
winding-up the heat-set film and then,
applying an antifog-coating composition to the heat-set wound-up polyester film with conventional coating technology via off-line wet application; and
then drying and winding-up the coated polyester film.

* * * * *